United States Patent [19]

Tang

[11] Patent Number: 5,740,836

[45] Date of Patent: Apr. 21, 1998

[54] BALL VALVE FAUCET

[75] Inventor: Tage Tang, Vejle, Denmark

[73] Assignee: Masco Corporation, Taylor, Mich.

[21] Appl. No.: 817,886

[22] PCT Filed: Oct. 5, 1995

[86] PCT No.: PCT/US95/13033

§ 371 Date: Apr. 4, 1997

§ 102(e) Date: Apr. 4, 1997

[87] PCT Pub. No.: WO96/12128

PCT Pub. Date: Apr. 25, 1996

[30] Foreign Application Priority Data

Oct. 5, 1994 [DK] Denmark ................................. 1153/94

[51] Int. Cl.[6] ................................................ F16K 11/087
[52] U.S. Cl. ........................... 137/625.41; 137/636.2

[58] Field of Search ........................ 137/625.41, 636.2

[56] References Cited

U.S. PATENT DOCUMENTS

2,592,062  4/1952  Perry ........................... 137/625.41

*Primary Examiner*—John Fox
*Attorney, Agent, or Firm*—Reising, Ethington, Barnard & Perry

[57] ABSTRACT

A mixing valve has a cartridge assembly that includes a ball valve with a control stem for adjusting the movable ball valve for controlling the flow rate and temperature mix of the mixed water. The ball valve has a pin extending therethrough that is received in vertically extending slots and in a cartridge housing member. The pin is press fitted int the ball valve to prevent the ball from falling out the lower open end of the cartridge.

16 Claims, 4 Drawing Sheets

BALL VALVE FAUCET

TECHNICAL FIELD

The field of this invention relates to a faucet mixing valve and more particularly to a ball valve cartridge for a mixing valve.

BACKGROUND OF THE DISCLOSURE

Single handle faucets, commonly referred to as mixing valves, that control the flow of both hot and cold water have seen vast consumer acceptance. The faucets are commonly constructed such that a handle or knob is movable in two distinct directions to adjust the mix of hot and cold water and to adjust the volume rate, i.e. flow.

The two basic types of mixer valves that have seen widest commercial acceptance are plate valves and ball valves. Ball valves offer a reliable compact construction that is durable. Plate valves offer a drive mechanism that have long been amenable to be packaged into a cartridge form.

Known plate valve cartridges have housed the movable and fixed valve plates. The cartridge can easily be removed and replaced with another in order to effect an easy repair to the faucet. After the water supply is turned off to the faucet, the faucet is merely opened and the cartridge is easily replaced. This type of repair can be accomplished without the need to call in skilled labor.

While plate valves have long been incorporated into a cartridge format, ball valves have only recently been amenable to a cartridge construction. The difficulties in the development of a commercially successful cartridge for a ball valve are several fold. Firstly, the floating nature of the traditional ball valve demanded that any cartridge completely surround and capture the ball valve, otherwise the ball valve simply falls out of the bottom of the cartridge. Secondly, the compact nature of the ball valve construction in the faucet body leaves little room for the inclusion of a cartridge. The introduction of traditional cartridges that house and capture the ball into the faucet housing undesirably demands that the housing be made taller to incorporate the added height needed for the inclusion of the cartridge.

Furthermore, traditional cartridges impede selective repair to worn elastomeric seals. The cartridge houses both the moving valve element and the fixed valve ports which often include the elastomeric port seals. Most of the wear and resulting leakage in a faucet is the result of the repetitive motion of the moving ball valve element on the elastomeric port seals. Because the seals are encased in the cartridge, the entire cartridge is replaced including the many yet good cartridge components that still have a remaining long useful life. The desire to eliminate waste however is offset by the need to simplify the repair operation. Furthermore, many cartridges are permanently assembled together and do not permit temporary dismantling.

Even for cartridges that can be dismantled, the advantages of a cartridge is lost if the cartridge dismantles into all of its component parts. The movable valve element falls out and is often not replaced in its correct orientation. This misinstallation can easily occur for symmetrical plate valves and ball valves which are inherently symmetrical. It takes a knowledgeable and skilled person to avoid mounting symmetrically appearing ball valves in a cartridge in an incorrect orientation.

The ball valve cartridges that have been devised allow the handle to be operated in the same fashion as known plate type mixer valves. Some of these ball type mixer valves require the introduction of another moving part in the form of a rotatable plate mounted above the ball valve element. One such ball valve is disclosed in U.S. Pat. No. 4,449,551 issued to Lorch on May 22, 1984. Another ball construction which mimics the handle motion of plate valves is disclosed in PCT publication WO 92/22765 published on Dec. 23, 1992. This ball incorporates a horizontal pin extending through its equator to vertically affix the ball in the housing.

The ball valve construction of the faucets disclosed in these two above noted disclosures allows for an orbiting motion of the handle about a fixed longitudinal axis of the faucet body and a rocking, i.e. pivoting, motion about a movable horizontal axis relative to the valve body. The movable horizontal axis is perpendicular to the longitudinal axis of the faucet body and is fixed with respect to the handle such that it moves about the housing as the handle rotates about the fixed longitudinal axis. By having a fixed longitudinal axis, ball valves with this type of motion can be expeditiously fixed within a cartridge by use of a horizontal pin extending through the ball and into a horizontal slot in a cartridge.

The temperature mix of the hot and cold water can be accurately adjusted by orbiting the handle about the longitudinal axis when the handle is at or near the off position.

However, the temperature sensitivity and fine temperature adjustment of the above described ball valve construction is diminished when the valve is turned on toward the full open position. This diminishing effect is due to the fact that the control stem is often attached to a levered handle that extends forward from the stem. Upon opening motion .i.e. rocking of the stem rearwardly, the lever handle distal end moves closer toward the vertical fixed longitudinal axis of temperature rotation. Thus the effective torque arm length for temperature adjustment is substantially shortened. This shortened arm of torque inhibits fine temperature adjustment.

Alternative types of ball drive mechanisms are available and may be desirable in certain situations where accurate temperature adjustment is needed during full flow conditions. These alternative types of ball drive mechanisms have the fixed axis of rotation being transverse to the longitudinal axis of the faucet body i.e. horizontal on many lavatory faucets. One ball valve drive mechanism has a second horizontal fixed axis and the movable axis being substantially perpendicular to the thereto. The movable axis of rotation is pivotable in a vertical plane about the fixed axis with motion of the ball and centered about a horizontal position. An example of this type of ball drive mechanism is disclosed in U.S. Pat. No. 3,056,418 issued to Adams et al. on Oct. 2, 1962. Another known ball drive mechanism has the fixed and movable axis in the vice versa position from that of the Adams disclosure. An example of this type of ball drive mechanism is disclosed in U.S. Pat. No. 2,592,062 issued to Perry on Apr. 8, 1952.

However, these alternative types of ball valve drive mechanisms that provide for better temperature adjustment at high flow rates have not been amenable to be advantageously installed in a cartridge assembly for several reasons. One reason is partly due to the absence of a fixed axis of rotation that is oriented longitudinally through the faucet body. This absence of the fixed longitudinal axis has impeded development of a mechanism that adequately packages the ball within a conveniently sized cartridge while both affixing the ball in a vertical locked position and maintaining the restraints to pivot the ball about the required two axes, the fixed one being horizonal and a movable one perpendicular thereto.

What is needed is an expeditiously manufactured ball valve construction that provides for mounting of the ball element in a cartridge for a mixer valve that operably seats the ball valve. What is also needed is an expeditiously manufactured faucet with a ball valve element that provides for ease in temperature adjustment during the full on position.

SUMMARY OF THE DISCLOSURE

In accordance with one aspect of the invention, a faucet mixer valve has a movable ball valve element pivotably mounted in a cavity of a faucet body. The cavity is in fluid communication with a plurality of inlet ports and at least one outlet port. The ball valve has at least a partially spherical relying surface and a plurality of inlet openings in its relying surface. The openings cooperate with the ports to control fluid flow in both flow rate and temperature mix. The ball valve has an attached control stem that passes through a control opening in the faucet body. A handle may be operably connected to the stem. A sealing gasket is seated in a seal seat about the control opening and sealingly abuts against the movable ball valve element and body.

The ball valve element has a pin extending therefrom in a plane of symmetry interposed between the hot and cold water openings in the ball valve element. The housing body has a first longitudinally extending slot therein that extends along the plane of symmetry between the hot and cold inlet ports. The slot slidably and pivotably receives the pin such that the ball valve element is rotatable along a first movable axis that is aligned with the pin and a second fixed axis that is orthogonal to both the longitudinal slot and the first axis.

Preferably, the faucet body includes a cartridge housing member that pivotably receives the ball valve. The faucet body has a cavity which is sized to seat the cartridge housing. The cartridge housing has an upper opening for allowing the control stem to pass therethrough. The cartridge housing member has a first longitudinally extending slot therein. The slot is within an inner wall of the cartridge and the pin transversely extends from the ball valve element and is slidably and pivotably received in the slot in the cartridge such that the ball valve element.

The cartridge has a lower opening through which the ball valve element protrudes to be cooperative with the inlet ports such that the ball valve element directly abuts elastomeric inlet port seals housed at the downstream end of respective inlet ports. The cartridge housing member preferably has a second longitudinally extending slot diametrically opposite the first longitudinally extending slot. The pin preferably extends completely through the ball element such that it has first and second distal ends extending at diametrically opposed sections of the ball valve with each pin end received in the respective first and second slots in the cartridge. The respective first and second slots have a lower end spaced above the lower opening. Each lower end has an abutment shoulder for abutting the respective pin ends. The respective pin ends are spaced farther apart than the diameter of the lower opening such that the ball valve element is retained within said cartridge by the pin ends in the slots above the abutment shoulders.

In one embodiment, one slot in the cartridge has a side passage extending through to the outer wall of the cartridge. The pin is passed through the side passage to be press fitted into the ball valve for installation of the ball valve into the cartridge.

In one embodiment, the upper opening of the cartridge or valve body is shaped and positioned to be symmetrical about the plane of symmetry containing the axis of the longitudinal slots. The opening has a front semi-circular arced front edge of approximately 180° and two radially running rear straight edges forming an angled corner of approximately 160°. A notch is positioned at the midpoint of the semi-circular edge and sized to laterally receive the control stem.

Desirably, the ball valve element has a pair of cold water inlet openings separated by a thin dividing rib and a pair of hot water inlet openings separated by another thin dividing rib. The plane of symmetry is interposed between the two pairs of inlet openings when the ball valve is in a intermediate mix position. It is also desirable that the ball valve element has a pair of outlet openings arranged symmetrically between the cold and hot water inlet openings.

In accordance with another aspect of the invention, a ball valve cartridge assembly has a ball valve with a pin extending therefrom and extending into a vertical slot at the inner wall of a cartridge housing.

BRIEF DESCRIPTION OF THE DRAWINGS

Reference now is made to the accompanying drawings in which.

DETAILED DESCRIPTION OF THE PREFERRED EMBODIMENT

Figure 1:
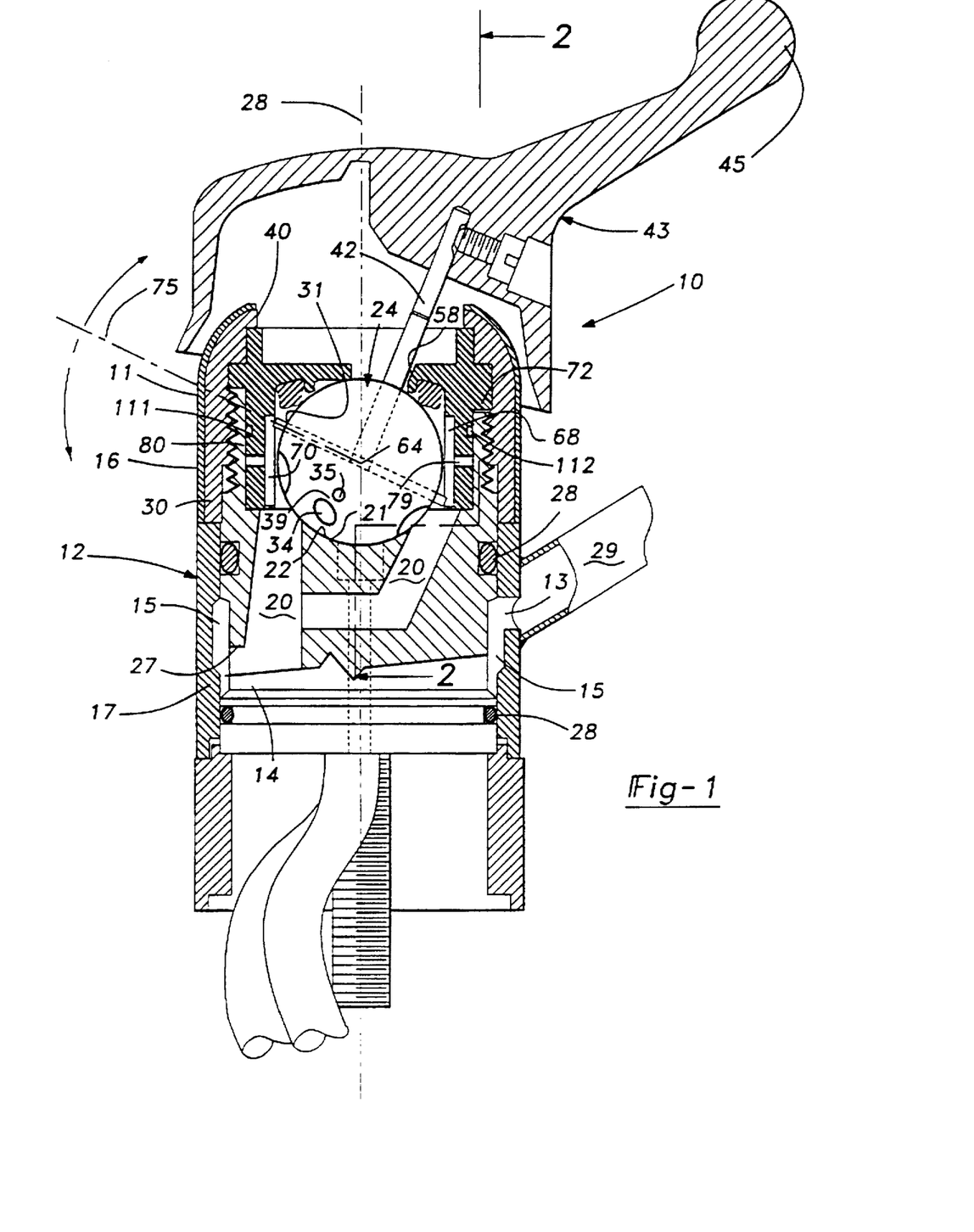
FIG. 1 is a side elevational and partially segmented view of a faucet mixer valve according to one embodiment of the invention illustrating the faucet in the off position.
Figure 2:
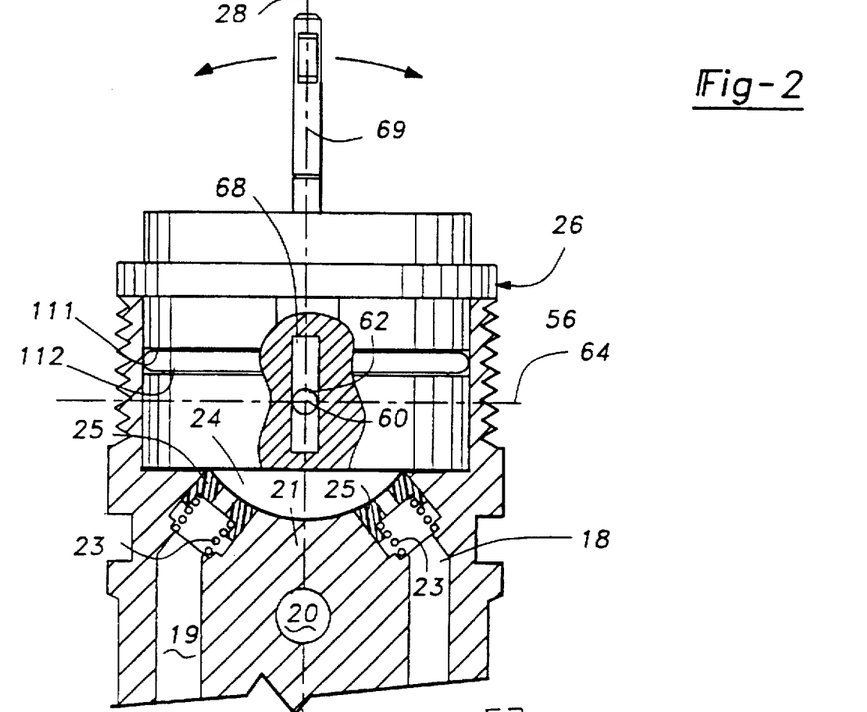
FIG. 2 is a fragmentary cross-sectional view of the cartridge assembly and faucet body taken along lines 2—2 shown in FIG. 1.
Figure 3:
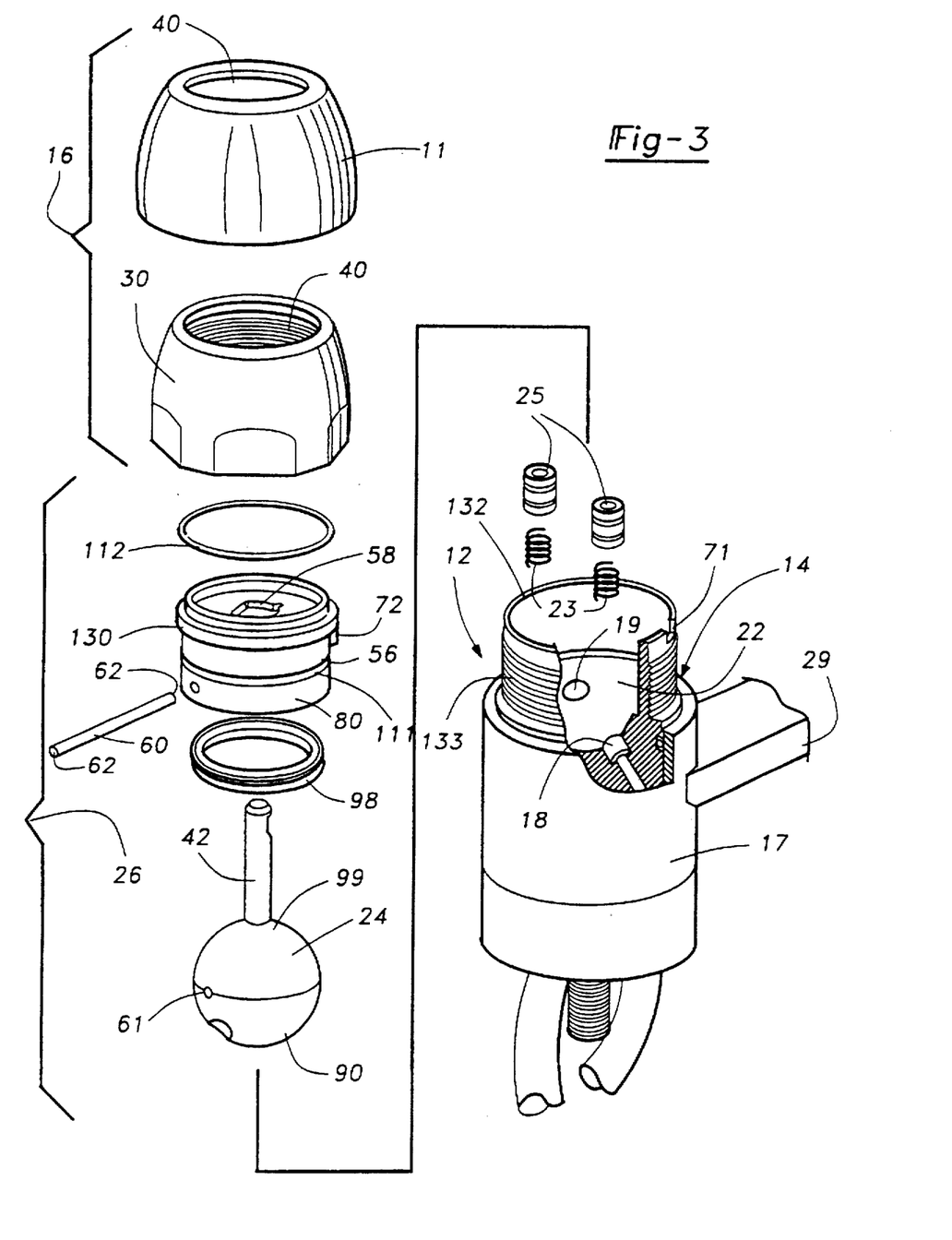
FIG. 3 is an exploded perspective view of the mixer valve shown in FIG. 1.

Referring now to FIGS. 1–3, a mixing valve 10 has a conventional valve housing or body 12 that is formed from a housing base member 14 and a cover assembly 16. The base member 14 has a cavity 22 formed therein with a substantially semi-spherical lower surface 21. Two inlet ports 18 and 19 for cold and hot water have downstream ends counter bored into the lower surface 21 to form a seat for two biasing springs 23 which bias tubular elastomeric sealing elements 25 against a ball valve element 24 that is housed in a cartridge assembly 26. A front and rear outlet passage 20 extends from the lower surface 21 and through a side cylindrical wall 27 for the passage of mixed water from cavity 22.

A conventional tubular shell 17 is sealingly and slidably mounted about the lower base member 14 and forms an annular chamber 15 in fluid communication with front and rear outlet passages 20. O-ring seals 28 interposed between the housing 12 and tubular shell 17 prevent undesirable water leakage therebetween. A spout 29 is affixed to the shell and in fluid communication with the annular chamber 15 through aperture 13 in shell 17. The cover assembly 16 includes a threaded cap member 30 that is screwed onto the base member 14. A cosmetic shell 11 can be positioned over the member 30.

Figure 5:
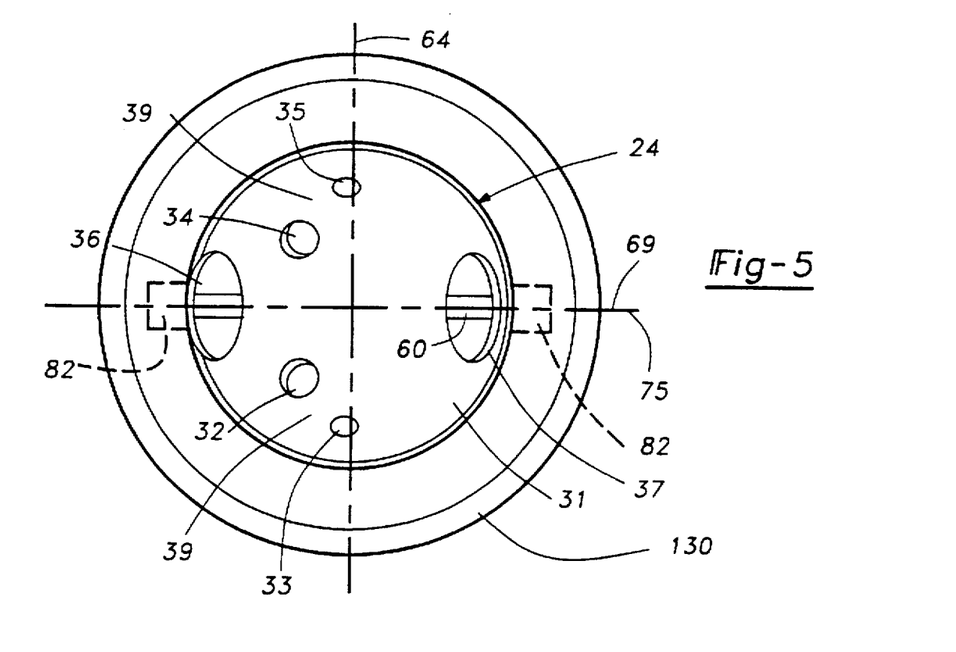
FIG. 5 is a bottom plan view of the cartridge assembly shown in FIG. 1.

As clearly shown in FIG. 5, the ball valve element 24 has a substantially spherical valve surface 31 with an appropriately shaped and positioned cold inlet openings 32 and 33, and hot inlet openings 34 and 35. The cold inlet openings 32 and 33 are spaced apart to form a thin rib 39 therebetween. The hot water inlet openings 34 and 35 are similarly spaced apart to also have a thin similar rib 39 interposed therebetween. A pair of outlet openings 36 and 37 also extend therethrough. The shape of the surface 31 substantially complements the concave shape of the lower surface 21 of cavity 22. The openings 32, 33, 34 and 35 cooperate with the respective inlet ports 18 and 19 and outlet openings 35 and 36 that is in fluid connection with outlet passage 20 to regulate the mixture ratio of water and flow rate, i.e. volume of total water per unit time from the two inlet ports 18 and 19 to the outlet passage 20.

The cover assembly 16 has a control opening 40 therethrough. The cover 16 is positioned such that the longitudinal axis 48 of the valve housing 12 passes through the control opening 40. The cartridge 26 includes a housing member 56 that has an upper opening 58 aligned under opening 40.

A control stem 42 is fixedly connected to the ball valve element 24. A control stem 42 extends through the control opening 40. The control stem 42 is constructed to be affixed to a faucet handle 43 in a conventional fashion. The handle 43 is a lever style handle with a distal lever end 45.

The cartridge assembly 26 has the ball valve element 24 pivotably mounted to the cartridge housing member 56. The housing member 56 may be manufactured from known plastic material suitable for faucet applications. The ball valve element 24 also has a cylindrical pin 60 extending therethrough with its distal ends 62 extending to the exterior of ball valve surface 31. The pin 60 may be affixed to the ball valve by being press fitted into diametrically opposed holes 61 through surface 31. The pin 60 is positioned to intersect the center 66 of the ball valve 24 and lie perpendicular to control stem 42.

Each distal end 62 is positioned in a longitudinally extending slot 68 and 70 in the interior cylindrical wall 57 of cartridge housing member 56. The slots 68 and 70 are diametrically opposed and are vertically oriented as shown in the figures. It should be understood however when the faucet valve is installed on a wall, the longitudinal direction may be horizontal. The lower end of slots 68 and 70 end above the lower open end 92 to form abutment shoulders 82. The shoulders 82 are spaced apart at a distance less than the spacing of ends 62 to retain the ball valve in the cartridge housing member 56.

Each slot 68 and 70 has a central axis disposed in a plane of symmetry 69. Slot 70 has a window passage 79 that extends through the exterior wall 80 of cartridge housing 56. As shown in FIG. 2, the slots 68 and 70 have a width to form only enough clearance to allow sliding movement of the pin ends 62 in slots 68 and 70 about a fixed horizontal axis 64 that is perpendicular to plane 69 and thus also perpendicular to longitudinal slots 68 and 70. Desirably no lateral spacing exists between slots 68 and 70 and the pin ends 62 such that no significant rotation of the ball valve 24 along a direction that is commonly referred to as the width of the slot.

Because each distal end 62 is cylindrical, they have a circular cross sections that allows them to pivot in slots 68 and 70 about an axis 75 of the pin 60. The axis 75 lies in plane of symmetry 69 that is perpendicular to horizontal fixed axis 64. Axis 75 intersects axis 64 at the center 66 and is movable with the pin 60 i.e. it remains stationary with respect to the ball valve 24 but is movable with respect to the valve housing 12. Axis 75 is also perpendicular to the axis of control stem 42. In other words, movable axis 75 is orthogonal and remains orthogonal to both control stem 42 and fixed axis 64 during normal operation of the faucet. Axis 64 is perpendicular to both axis 75 and longitudinal slots 68 and 70.

The ball valve element 24 has a lower section 90 of the valving surface 31 protruding through the large lower open end 92 of the cartridge housing 56. The protruding section 90 is a significant portion of the ball valve 24 as clearly shown in FIGS. 1 and 2. The valving surface 31 with the inlet openings 32, 33, 34, and 35 and outlet openings 36 and 37 operably and directly abuts the spring biased sealing elements 25 housed in inlet ports 18 and 19 as shown in FIG. 2.

The inlet ports 18 and 19 are symmetrically placed about opposite sides of the plane of symmetry 69. The outlet ports 20 are aligned with the plane of symmetry 69 under the pin 60. The pin 60 extends between the inlet ports 18 and 19. Cold water inlet openings 32 and 33 and hot water inlet openings 34 and 35 are symmetrically positioned about the plane of symmetry 69 when the ball valve is in an intermediate temperature position as illustrated in FIGS. 2 and 5. Outlet openings 36 and 37 are also aligned symmetrically with plane of symmetry 69 when the ball valve is in the intermediate mix position as shown in FIGS. 2 and 5.

The upper section 99 of ball element 24 is housed within the interior chamber 101 of cartridge housing 56 defined in part by interior depending cylindrical wall 80. The interior chamber 101 is in fluid communication with cavity 22 of valve housing 12.

Figure 4:
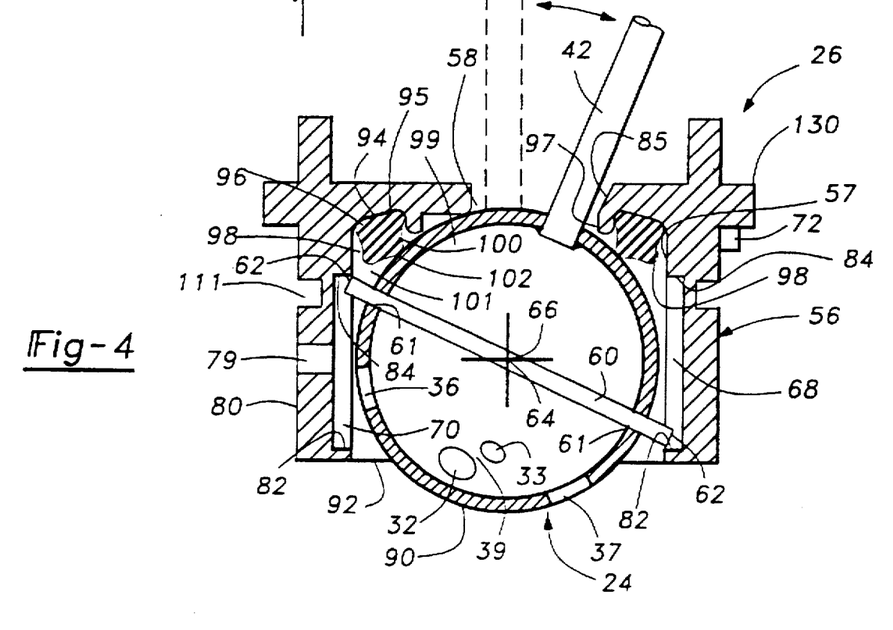
FIG. 4 is an enlarged fragmentary cross-sectional view of the cartridge assembly shown in FIG. 1.

As shown in FIGS. 1 and 4, the annular gasket seat 94 is positioned about the upper opening 58 and faces ball element 24 within chamber 101. The gasket seat 94 is canted with its inner periphery 95 positioned higher than its outer periphery 96. A downwardly depending shoulder or collar 97 vertically depends at the inner periphery and is in close proximity to the ball valve upper section 99 to allow for manufacturing tolerances.

An annular gasket seal ring 98 is mounted in the cartridge housing 56 against the seat 94 such that it is placed under a preload with its inner periphery 100 twisted to be higher than its outer periphery 102. The upper section 99 of ball surface 29 that abuts gasket seal ring 98 is properly polished to the appropriate smoothness to provide a proper seal with the gasket.

Other seal constructions are possible such as a simple O-ring or a lip seal. The seal does not need to be constructed for severe compression because the collar 97 provides a controlled upper limit as to the amount of pressure exerted on the seal between the ball 24 and cartridge housing 56.

The outer surface of housing wall 80 has an annular groove 111 which seats an O-ring 112. The O-ring 112 is sized to seal the cartridge outer periphery 110 with the cavity 22 in lower body member 14 of housing 12.

Rocking of the control stem 42 along the fixed horizontal axis 64 pivots the ball valve element 24 about the pivot axis 64 independently of the rotated position of the ball valve member about movable axis 75. The distal ends 62 of the pin 60 slide along the respective slots 68 and 70 to allow the ball valve element 24 to rotate about axis 64. Rotation of the pin 60 within slots 68 and 70 allows the ball valve element 24 to rotate about axis 75.

The rotation of the ball valve element 24 about axis 64 is limited by the lower stop shoulders 82 and upper stop shoulders 84 of slots 68 and 70 that abut pin 64. The rotation of the ball valve element 24 about axis 64 as illustrated in FIG. 4 adjusts the flow rate of the discharged water.

Figure 6:
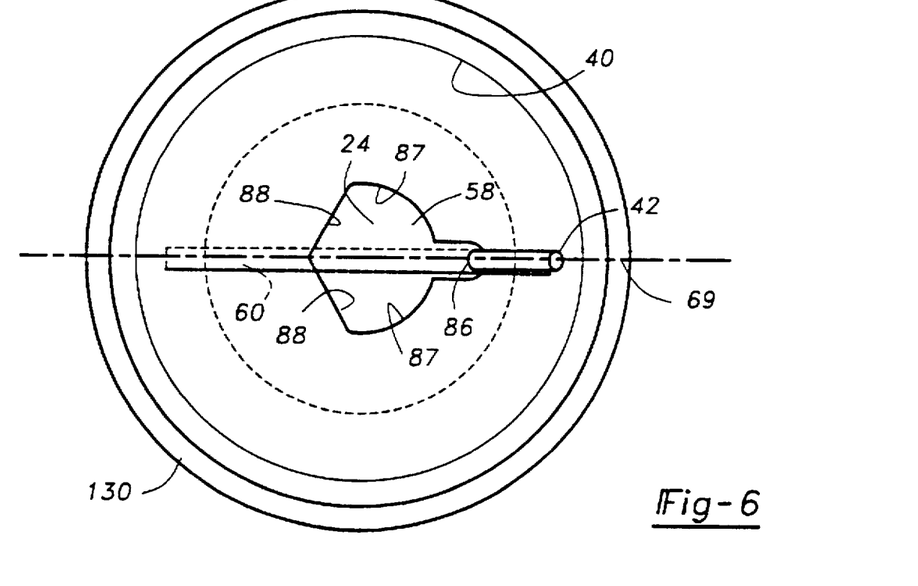
FIG. 6 is a top plan view of the cartridge assembly.

Alternately, or in addition to the stop shoulders 82 and 84, the rotation of the ball about axes 64 and 75 may also be limited by radial edge of the upper opening 58 in the cartridge housing member 56. As clearly shown in FIG. 6, the opening 58 may be shaped such that a notch 86 is wide enough to receive the control stem 42. A semi-circular arced edge 87 of approximately 180° extends therefrom symmetrically from notch 86. Two straight rear edges 88 run from the arc and meet to form an angle of approximately 160° at the plane of symmetry 69.

The cartridge is assembled with the gaskets 98 and 112 properly seated. The ball is installed in the cartridge by first placing the ball in the housing 56 from the lower opening 92 and extending stem 42 through opening 58. The holes 61 are aligned with a window 85. Pin 60 is then pushed through window 85 and is press fitted into both holes 61 and is retained by the press fit therein.

The lower opening 92 may optionally have a dimension slightly smaller than the diameter of the ball valve 24. The ball 24 may be fitted into the chamber 101 through the opening 92 by flexing of the plastic material of the cartridge housing member 56 in proximity to end 92 to allow shoulders 82 to become more distant.

The fall with pin 60 can then slide past shoulders 82. When the plastic is released, the shoulders 82 snap back into place to retain the ball and pin therein. The assembled cartridge 26 is a self contained assembly that can be sold separately as a repair replacement for later installation into the faucet mixer valve 10.

As shown in FIG. 3, the assembled cartridge 26 is placed in cavity 22 of the faucet body 14. The slot 71 in base 14 properly positions the cartridge 26 with lug 72 in the cartridge and ledge 130 properly vertically positions the cartridge 26 on a corresponding ledge 132 in base member 14. Threaded cap member 23 is then threaded onto the upright flange 133 to downwardly press the cartridge 26 against ledge 132.

For repairs to the faucet, only those parts that are needed to be replaced, normally only the elastomeric seals 25, are in fact replaced while maintaining the advantages of ease of assembly and reassembly of a cartridge faucet assembly.

The need for a large resilient biasing regulation ring intended to push down the ball 24 against the spring biased sealing elements 25 is eliminated. Gasket seal ring 98 functions solely to prevent leakage between the ball valve element 24 and cartridge housing 56. The O-ring 112 functions solely to prevent leakage between the cartridge housing 56 and lower base member 14.

Furthermore, a ball valve element is easily incorporated into a replaceable cartridge assembly 26 without necessitating an increase in the overall height of the valve housing 12 as compared to prior art mixing valves incorporating ball valve elements. The cartridge assembly is easily assembled.

The drive mechanism for this ball valve provides ease of temperature adjustment no matter at what flow rates. The temperature mixing adjustment does not degrade at higher flow rates. The distal end 45 of the handle 43 maintains a constant distance from the two axes of rotation 64 and 75 thus maintaining the same temperature sensitivity of operation independent of the amount of flow rate.

Variations and modifications are possible without departing from the scope and spirit of the present invention as defined by the appended claims.

The embodiments in which an exclusive property or privilege is claimed are defined as follows:

1. In a faucet mixer valve having a movable ball valve element mounted in a housing body that defines a cavity, said body having a plurality of inlet ports and an outlet port in fluid communication with said cavity, said ball valve element cooperating with said inlet ports to control liquid flow in both flow rate and temperature mix through said ports, said housing body having a control opening therethrough, said ball valve element having a control stem connected thereto and extending through said control opening, the improvement characterized by:

said mixer valve being in cartridge form with a cartridge having a housing member;

said cartridge housing member having an upper opening for allowing said control stem passing therethrough and a lower end;

said cartridge housing having a seal seat about said upper opening;

a sealing gasket being seated in said seal seat about said upper opening in said cartridge housing and sealingly abuttable against said movable ball valve element;

said cartridge housing having a first longitudinally extending slot therein extending between said upper opening and said lower end; and a pin transversely extending from said ball and slidably and pivotably received in said slot of said cartridge such that said ball is rotatable along a first axis that is aligned with said pin and a second axis that is transverse to said longitudinal slot and said first axis.

2. In a faucet mixer valve as defined in claim 1 further characterized by:

said cartridge having member a lower opening through which said movable ball valve element protrudes into said in said housing body to be cooperative with said inlet ports;

a second longitudinally extending slot diametrically opposite said first longitudinally extending slot;

said ball having first and second pin distal ends extending at diametrically opposed sections of said ball with each pin end received in a respective first and second slot;

said respective first and second slot having member a lower end having an abutment shoulder for abutting said respective pin ends above the lower opening; and said respective pin ends being spaced farther that the diameter of said lower opening such that said ball valve is retained within said cartridge by said pin ends in said slots above said abutment shoulders.

3. In a faucet mixer valve as defined in claim 2 further characterized by:

each longitudinal slot being aligned along a plane of symmetry between the plurality of inlet ports.

4. In a faucet mixer valve as defined in claim 3 further characterized by:

said upper opening of the cartridge housing member being shaped and positioned to be symmetrical about the plane of symmetry containing the axis of the longitudinal slots;

said opening having a front semi-circular arced edge of approximately 180° and two radially running straight rear edges forming an angle of approximately 160°; and a notch positioned at the center of the semicircular arc and sized to laterally receive the control stem.

5. In a faucet mixer valve as defined in claim 3 further characterized by:

said ball valve having a pair of cold water inlet openings separated by a thin dividing rib and a pair of hot water inlet openings separated by another thin dividing rib; and said plane of symmetry being interposed between the two pairs of inlet openings when said ball valve is in an intermediate mix position.

6. In a faucet mixer valve as defined in claim 5 further characterized by:

said ball valve having a pair of outlet openings arranged symmetrically between said cold and hot water inlet openings.

7. In a faucet mixer valve having a movable ball valve element mounted in a housing body that defines a cavity, said body having a plurality of inlet ports and an outlet port in fluid communication with said cavity, said ball valve element cooperating with said inlet ports to control liquid flow in both flow rate and temperature mix through said ports, said housing body having a control opening therethrough, said ball valve element having a control stem connected thereto and extending through said control opening, the improvement characterized by:

said housing body having a first longitudinally extending slot therein;

a pin transversely extending from said ball valve element and slidably and pivotably received in said slot of said housing body such that said ball valve element is rotatable along a first axis that is aligned with said pin and a second axis that is transverse to said longitudinal slot and said first axis; and said longitudinal slot being aligned along a plane of symmetry that is interposed between the plurality of inlet ports.

8. In a faucet mixer valve as defined in claim 7 further characterized by:

said control opening including contoured edges being shaped and positioned to be symmetrical about the plane of symmetry containing the axis of the longitudinal slot;

said contoured edges having a front semicircular arced edge section of approximately 180° and two radially running rear lines forming an angle of approximately 160°; and a notch positioned at the center of the semicircular arc and sized to laterally receive the control stem.

9. In a faucet mixer valve as defined in claim 7 further characterized by:

said ball valve element having a pair of cold water inlet openings separated by a thin dividing rib and a pair of hot water inlet openings separated by another thin dividing rib;

said plane of symmetry being interposed between the two pairs of inlet openings when said ball valve element is in an intermediate mix position.

10. In a faucet mixer valve as defined in claim 9 further characterized by:

said ball valve element having a pair of outlet openings arranged symmetrically between said cold and hot water inlet openings.

11. A ball valve cartridge for a mixer valve characterized by:

a ball valve element having at least one inlet and an outlet;

a cartridge housing member having a lower opening through which said movable ball valve element protrudes, said ball valve element being sealable in proximity to inlet ports of said mixer valve below said cartridge such that its at least one inlet is selectively alignable or misalignable with said inlet ports;

said cartridge housing member having an upper opening for allowing a control stem passing therethrough;

a sealing gasket being seated between said ball valve and said cartridge housing member for preventing fluid flow through said upper opening in said cartridge housing member;

said cartridge housing member having a first longitudinally extending slot therein extending between said upper opening and said lower opening; and a pin transversely extending from said ball and slidably and pivotably received in said slot of said cartridge housing member.

12. A ball valve cartridge as defined in claim 11 further characterized by:

said cartridge housing member having a lower opening through which said movable ball valve element protrudes into a recess in said mixer valve to be cooperative with said inlet ports;

a second longitudinally extending slot diametrically opposite said first longitudinally extending slot;

said ball having a first and second pin distal end extending at diametrically opposed sections of said ball with each pin end received in a respective first and second slot;

said respective pin ends being spaced farther than the diameter of said lower opening such that said ball valve is retained within said cartridge by said pin ends in said slots.

13. A ball valve cartridge as defined in claim 12 further characterized by:

said longitudinal slot being aligned along a plane of symmetry between the plurality of inlet ports.

14. A ball valve cartridge as defined in claim 13 further characterized by:

the upper opening of the cartridge housing member being shaped and positioned to be symmetrical about the plane of symmetry containing the axis of the longitudinal slots;

said opening having a front semi-circular arced edge of approximately 180° and two radially running straight rear edges forming an angle of approximately 160°; and a notch positioned at the center of the semi-circular arc and sized to laterally receive the control stem.

15. A ball valve cartridge as defined in claim 13 further characterized by:

said ball valve element having a pair of cold water inlet openings separated by a thin dividing rib and a pair of hot water inlet openings separated by another thin dividing rib; and said plane of symmetry being interposed between the two pairs of inlet openings when said ball valve element is in an intermediate mix position.

16. A ball valve cartridge as defined in claim 15 further characterized by:

said ball valve element having a pair of outlet openings arranged symmetrically between said cold and hot water inlet openings.

* * * * *

UNITED STATES PATENT AND TRADEMARK OFFICE
CERTIFICATE OF CORRECTION

PATENT NO. : 5,740,836
DATED : April 21, 1998
INVENTOR(S) : Tage Tang

It is certified that error appears in the above-identified patent and that said Letters Patent is hereby corrected as shown below:

Column 7, line 23, please delete "fall" and insert therefor --ball--;

Column 3, line 41, after "element" add --is contained to move along two axes--.

IN THE CLAIMS:

Column 8, line 14, after "housing" insert --member--;

Column 8, line 18, after "housing" insert --member--;

Column 8, line 30, after "cartridge" insert --housing member--; and after "having", delete [member];

Column 8, line 32, after "said", first occurrence, insert --cavity--;

Column 8, line 39, after "having" delete [member];

Column 8, line 44, after "cartridge" insert --housing member--;

Column 9, line 63, delete "sealable" and insert --seatable--.

UNITED STATES PATENT AND TRADEMARK OFFICE
CERTIFICATE OF CORRECTION

PATENT : 5,740,836

DATED : April 21, 1998

INVENTOR(S) : Tage Tang

It is certified that error appears in the above-identified patent and that said Letters Patent is hereby corrected as shown below:

IN THE DRAWINGS;

In sheets 1 and 2, Figures 1 and 2, should be deleted to be replaced with the attached sheets showing the corrected Figures 1 and 2, as shown on the attached pages.

Signed and Sealed this

Second Day of January, 2001

Attest:

Attesting Officer

Q. TODD DICKINSON

Commissioner of Patents and Trademarks

Fig-1